United States Patent
Kim

(10) Patent No.: US 6,462,970 B2
(45) Date of Patent: Oct. 8, 2002

(54) SMPS PROTECTION CIRCUIT IN ELECTRONIC APPLIANCE

(75) Inventor: Sang Yeal Kim, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/939,830

(22) Filed: Aug. 28, 2001

(65) Prior Publication Data

US 2002/0027785 A1 Mar. 7, 2002

(30) Foreign Application Priority Data

Sep. 1, 2000 (KR) .......................................... 00-51732

(51) Int. Cl.[7] .............................................. H02M 7/04
(52) U.S. Cl. .......................................... 363/89; 363/97
(58) Field of Search ............................ 363/34, 37, 55, 363/52, 53, 84, 89, 95, 97

(56) References Cited

U.S. PATENT DOCUMENTS

| | | | | |
|---|---|---|---|---|
| 5,612,862 A | * | 3/1997 | Marusik et al. | 363/93 |
| 5,726,871 A | * | 3/1998 | Choi | 363/89 |
| 5,841,642 A | * | 11/1998 | Fitzgerald | 363/21 |
| 6,031,748 A | * | 2/2000 | Hong | 363/89 |
| 6,222,746 B1 | * | 4/2001 | Kim | 363/89 |
| 6,229,724 B1 | * | 5/2001 | Virtanen | 363/89 |

* cited by examiner

*Primary Examiner*—Adolf Deneke Berhane
(74) *Attorney, Agent, or Firm*—Jacobson Holman, PLLC

(57) ABSTRACT

Disclosed is an SMPS protection circuit, which can prevent unnecessary electric power consumption that may be caused due to a light load as well as damage of the SMPS protection circuit caused by a heavy load. According to the SMPS protection circuit, a voltage lowered by the load is fed back. If the fed-back voltage corresponds to the light load, the switching frequency of an SMPS transformer is downed. If the fed-back voltage corresponds to the heavy load, the SMPS protection circuit ceases to operate.

6 Claims, 6 Drawing Sheets

SMPS PROTECTION CIRCUIT IN ELECTRONIC APPLIANCE

BACKGROUND OF THE INVENTION

1. Field of the Invention

The present invention relates to an SMPS protection circuit in an electronic appliance.

2. Description of the Related Art

The following is a description of an SMPS protection circuit in an electronic appliance according to the conventional technology made with reference to the accompanying drawings.

FIG. 1 is a block diagram illustrating a construction of the SMPS protection circuit in an electronic appliance according to the conventional technology.

As shown in FIG. 1, the SMPS protection circuit in an electronic appliance according to the conventional technology comprises an AC generating Section 10 for generating an AC voltage, an AC rectifying section 11 for receiving the AC voltage generated from the AC Generating Section 10 and rectifying the AC voltage into a DC voltage, an SMPS transformer 12 for receiving the DC voltage rectified by the AC rectifying section 11 at a primary winding and inducing a voltage proportional to the number of turns of the primary winding with respect to the corresponding secondary winding, a power supply section 16 for receiving the AC voltage generated from the AC Generating Section 10 and converting the same to DC voltage to supply as a power source, a pulse generating section 17 operated by the voltage supplied from the power supply section 16 to generate pulses of a predetermined frequency, a frequency oscillating section 15 for providing a time constant for setting the frequency of the pulse generating section 17, a switching section for switching an input power source at the primary winding of the SMPS transformer 12, an output rectifying section 13 for rectifying the voltage induced to the secondary winding of the SMPS transformer 12 into a DC voltage in accordance with an operation of the switching section 18, and a load 14.

The following is a detailed description of an operation of the conventional SMPS protection circuit in an electronic appliance constructed as above.

As shown in FIG. 1, the AC rectifying section 11 receives the DC voltage generated from the AC Generating Section 10, and rectifies the same into a DC voltage so as to be transmitted to the SMPS transformer 12. The power supply section 16 converts the AC voltage generated from the AC Generating Section 10 to a DC voltage so as to be applied as a driving voltage of the pulse generating section 17. Subsequently, the pulse generating section 17 generates pulses of a predetermined frequency, and transmits the same to the switching section 18. The switching section 18 switches the DC power source applied to the primary winding of the SMPS transformer 12 in accordance with the pulses provided by the pulse generating section 17. Thereafter, an output rectifying section 13 rectifies an output from the secondary winding of the SMPS transformer 12 into the DC voltage. The rectified DC voltage is applied to the load 14. Here, the current generated through the load 14, i.e., the load current, is variable depending on a level of the load 14.

However, the conventional SMPS protection circuit operates irrespective of variation of the load current. As a consequence, electric power is unnecessarily consumed when the load 14 is light, while the SMPS protection circuit is damaged when the load 14 is excessive.

SUMMARY OF THE INVENTION

It is, therefore, an object of the present invention to provide an SMPS protection circuit that can prevent unnecessary electric power consumption and damage of itself by controlling the power source supplied to the SMPS transformer in accordance with the load on the SMPS protection circuit.

To achieve the above object, there is provided an SMPS protection circuit comprising: a power supply section for receiving and converting an AC voltage to a driving voltage, and outputting the same; a pulse generating section for receiving the driving voltage outputted by the power supply section to generate pulses of a predetermined frequency; a frequency oscillating section for providing a time constant to set the frequency of the pulses of the pulse generating section; an SMPS transformer having a primary winding for applying an input DC power source thereto, and a secondary winding for applying an AC power source thereto; a switching section for switching the DC voltage inputted to the primary winding in accordance with the pulses generated from the pulse generating section; an output rectifying section for rectifying the output DC power source of the SMPS transformer, and supplying the same to a load; an output current detecting section for outputting a predetermined signal corresponding to a difference between the DC power source outputted by the output rectifying section and the voltage descended due to the load; an output current feedback section for outputting a voltage corresponding to the predetermined signal outputted by the output current detecting section; a frequency down section for reducing the output power source of the SMPS transformer by downing the frequency of the output pulses from the pulse generating section through variation of the time constant of the frequency oscillating section, if the voltage outputted by the output current feedback section is within a first set voltage range representing that the voltage outputted by the output current feedback section is a light load region; and a power intercepting section connected between an output terminal of the driving voltage of the power supply section and the pulse generating section for ceasing operation of the SMPS transformer by ceasing operation of the pulse generating section.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention with unnecessary detail.

Figure 1:
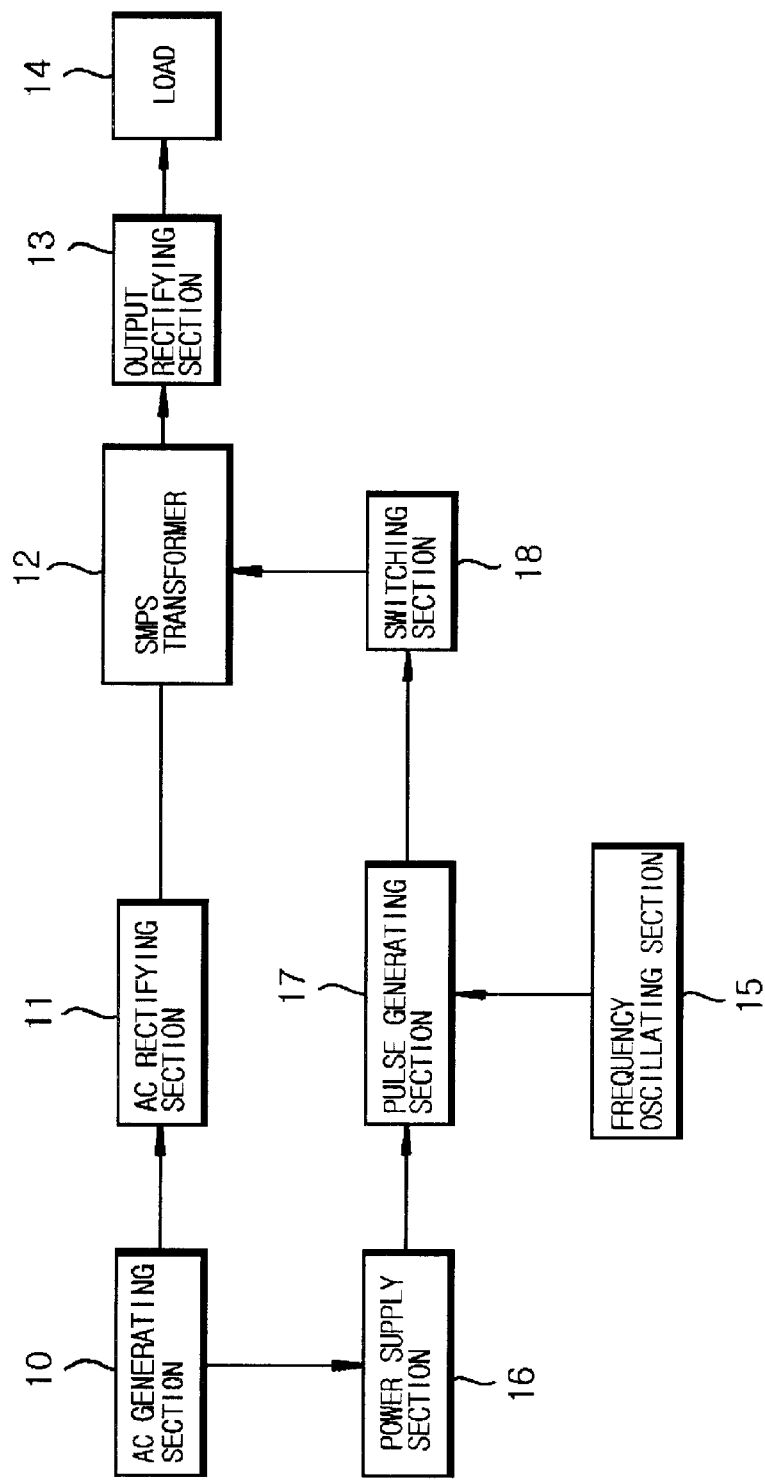
FIG. 1 is a block diagram illustrating a construction of an SMPS protection circuit according to the conventional technology.
Figure 2:
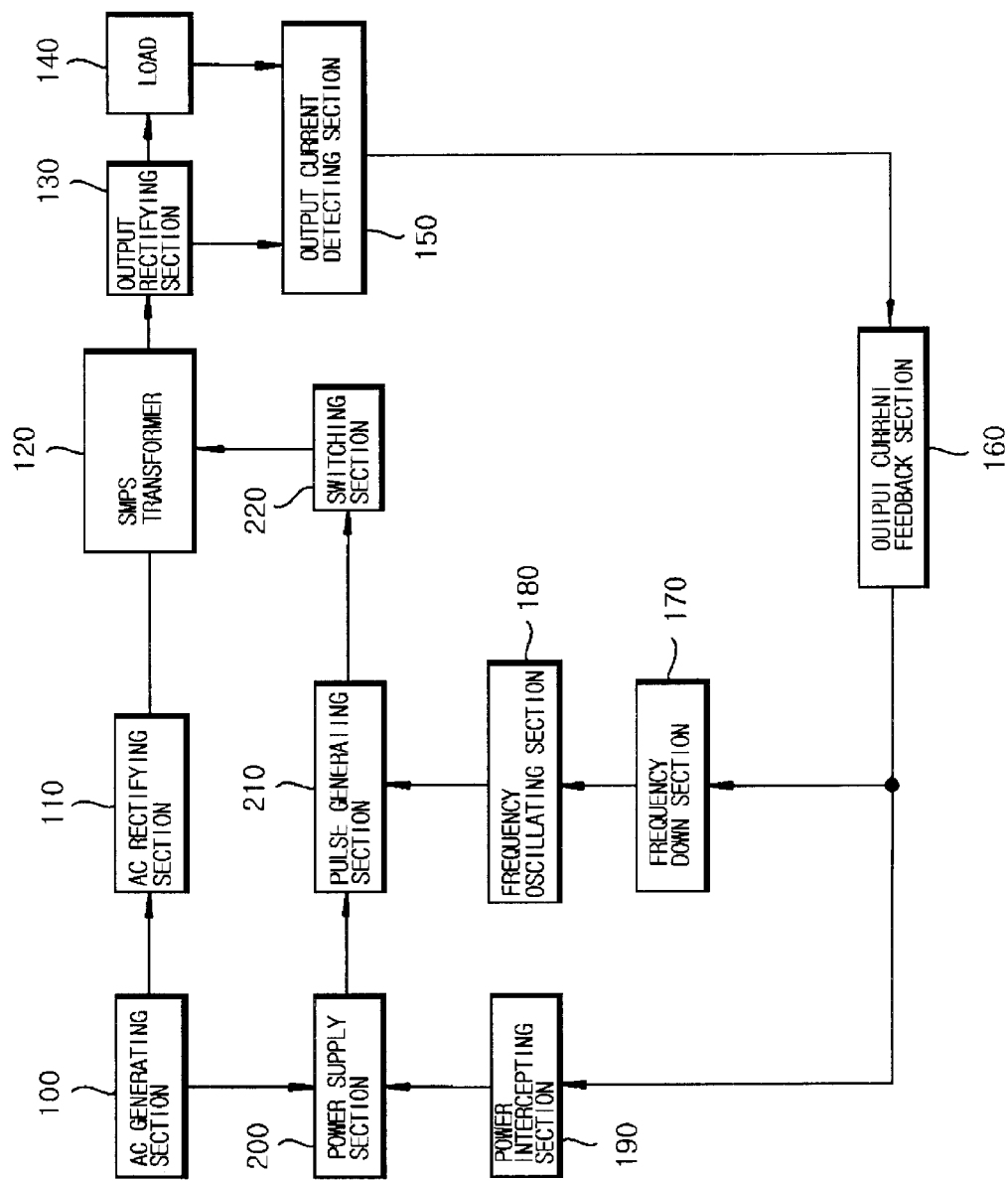
FIG. 2 is a block diagram illustrating a construction of an SMPS protection circuit in an electronic appliance according to a preferred embodiment of the present invention.

A construction of the SMPS protection circuit in an electronic appliance according to a preferred embodiment of the present invention will now be described with reference to FIG. 2. The SMPS protection circuit in an electronic appliance including a pulse generating section 210 for generating pulses of predetermined frequency, an SMPS transformer 120, an output rectifying section 130, and a load 140 comprises a switching section 220 for receiving pulse generated from the pulse generating section and switching the SMPS transformer 120, a power supply section for supplying power source to the pulse generating section 210, an output current detecting section 150 for converting the current corresponding to a difference between the voltage generated depending on a level of the load 140 and the DC voltage outputted by the output rectifying section 130 to an optical signal, an output current feedback section 160 for outputting voltage proportional to the optical signal transmitted by the output current detecting section 150, a frequency oscillating section 180 for providing a time constant for setting frequency of the pulse generating section 210, a frequency down section 170 for varying the time constant of the frequency oscillating section 180 in accordance with the voltage level outputted from the output current feedback section 160, and a power intercepting section 190 for bypassing the power source applied to the pulse generating section 210 in accordance with the voltage level outputted from the output current feedback section 160. Here, the SMPS protection circuit further comprises an AC Generating Section 100, and an AC rectifying section 110 for rectifying the voltage generated from the AC Generating Section 100 to apply the same to a primary winding of the SMPS transformer 120.

The output rectifying section 130 comprises a first diode $D_{110}$ having one end terminal connected to a secondary winding of the SMPS transformer 120 for rectifying the signal generated from the secondary winding of the SMPS transformer 120 to a DC voltage of a predetermined level, and a first capacity $C_{110}$ having one end terminal connected to a cathode of the first diode $D_{110}$ and the other end terminal grounded.

The output current detecting section 150 comprises a first resistor $R_{110}$ and a second resistor $R_{120}$ connected in parallel, a third resistor $R_{130}$ and a fourth resistor $R_{140}$ for dividing an input voltage into voltages of a predetermined level, an amplifier 150a for receiving the voltage passed through the second resistor $R_{120}$ at an inverting input terminal −, and receiving the voltage divided by the third resistor R130 and the fourth resistor R140 at a non-inverting input terminal + to output a voltage of a predetermined level, a fifth resistor $R_{150}$ having one end terminal connected to an output terminal of the amplifier 150a, a second diode $D_{120}$ having a cathode connected to the other end terminal of the fifth resistor $R_{150}$, a sixth resistor R160 having one end terminal connected to the cathode of the first diode $D_{110}$ of the output rectifying section 130, a third diode $D_{130}$ having one end terminal connected to the other end terminal of the sixth resistor $R_{160}$ and the other end terminal connected to an anode of the second diode $D_{120}$, and a seventh resistor $R_{170}$.

The output current feedback section 160 comprises a first transistor $Q_{110}$ operated by receiving a signal outputted from the third diode $D_{130}$ of the output sending section 150 at a base to output a voltage of a predetermined level.

The frequency down section 170 comprises a ninth resistor $R_{190}$ and a tenth resistor $R_{200}$ serially connected to an emitter of the first transistor $Q_{110}$ of the output current feedback section 160, a first Zener diode $ZD_{110}$ having a cathode connected between the ninth resistor $R_{190}$ and the tenth resistor $R_{200}$, which are serially connected to each other, and a breakdown voltage of a predetermined level, an eleventh resistor $R_{210}$ having one end terminal connected to the anode of the first Zener diode $ZD_{110}$ and the other end terminal grounded on earth, a second transistor $Q_{120}$ turned on or off by receiving a signal transmitted through the first Zener diode $ZD_{110}$ at the base, and a second capacitor $C_{120}$ having one end terminal connected to the emitter of the second transistor $Q_{120}$.

The power intercepting section 190 comprises a second Zener diode $ZD_{120}$ having a cathode connected to a collector of the first transistor $Q_{110}$ of the output current feedback section 160 and a breakdown voltage of a predetermined level, a third transistor $Q_{130}$ turned on or off by receiving the signal transmitted through the second Zener diode $ZD_{120}$ at the base and having an emitter connected to a ground terminal, a fourteenth resistor 240 and a fourth capacitor $C_{140}$ having one end terminal connected to the collector of the third transistor $Q_{130}$ in parallel and the other end terminal connected to a Vcc terminal of the pulse generating section 210, and a fourth transistor $Q_{140}$ having a base connected to a part, which connects the $14^{th}$ resistor $R_{240}$ and the fourth capacitor $C_{140}$ to the collector of the third transistor $Q_{130}$ in parallel, an emitter connected to a Vcc terminal of the pulse generating section 210 and a collector connected between the second Zener diode $ZD_{120}$ and the base of the third transistor $Q_{130}$.

Here, the third diode $D_{130}$ of the output current detecting section 150 and the first transistor $Q_{110}$ of the output current feedback section 160 are a couple of photo couplers.

The following is a detailed description of an operation of the SMPS protection circuit in an electronic appliance according to the present invention. As shown in FIG. 2, the AC rectifying section 110 receives an AC voltage generated from the AC Generating Section, and rectifies the same into a DC voltage. Subsequently, the SMPS transformer 120 receives the DC voltage rectified by the AC rectifying section 110 at a primary winding, and induces the same to the secondary winding. Also, the power supply section 200 converts the AC voltage generated from the AC Generating Section 100 to a DC voltage, and applies the same to the driving power source.

The pulse generating section 210 generates pulses of a predetermined frequency, and transmits the same to the switching section 220. The switching section 220 switches the power source inputted to the primary winding of the SMPS transformer 120 in accordance with the pulse transmitted from the pulse generating section 210. The secondary output of the SMPS transformer 120 due to the switching operation is transmitted to the output rectifying section 130. The output rectifying section 130 rectifies the output of the secondary winding of the SMPS transformer 120 as a DC voltage, and outputs the same.

Figure 3A:
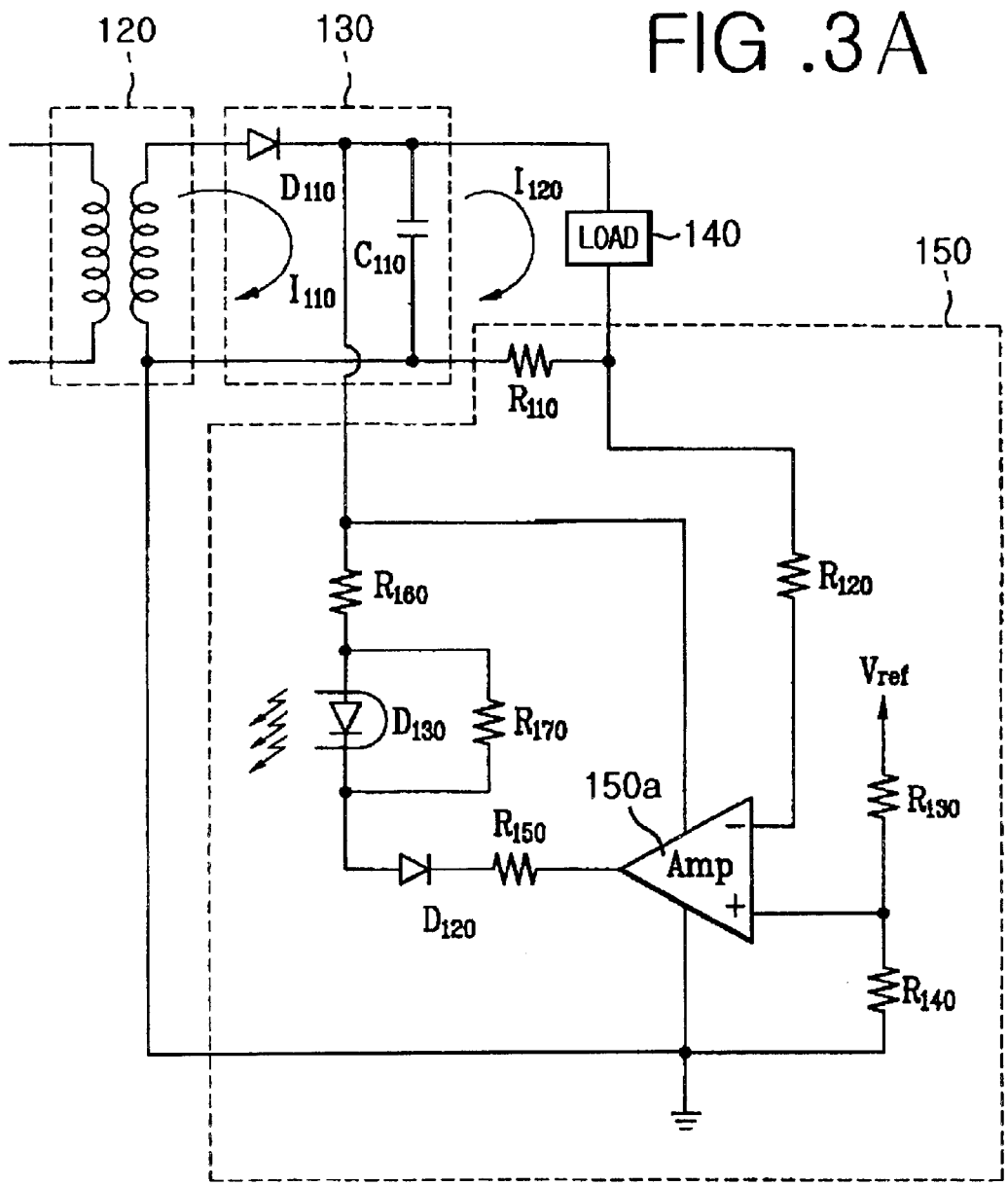
FIGS. 3A and 3B are circuit diagrams illustrating detailed parts of FIG. 2.
Figure 4A:
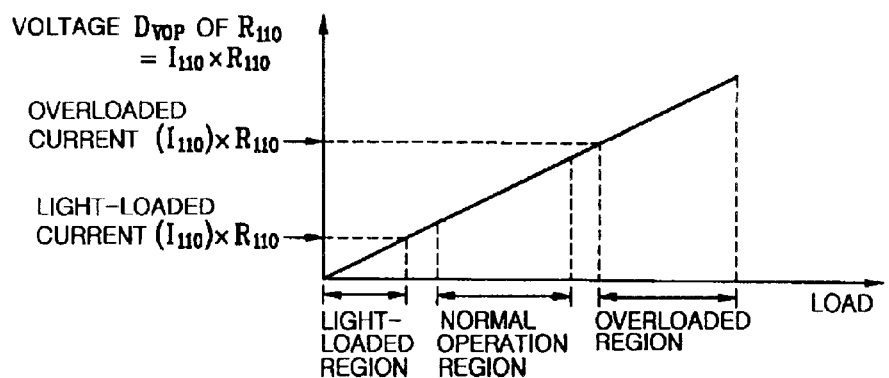
FIGS. 4A to 4E are wave diagrams illustrating outputs from each part in FIGS. 3A and 3B.

As shown in FIG. 3A, the first diode $D_{110}$ connected to the secondary winding of the SMPS transformer 120 rectifies the pulses transmitted from the SMPS transformer 120 into a DC voltage of a predetermined level. The rectified voltage is accumulated in the first capacity $C_{110}$ by means of a subsequent current $I_{110}$. The current $I_{120}$ passes the load 140 and the first resistor $R_{110}$ of the output current detecting section 150. The voltage laid on the first resistor $R_{110}$ according to the stream of the current $I_{120}$ is as shown in FIG. 4A. In other words, if the load 140 is light, a small amount of current is applied to the corresponding load 140. As a consequence, a small amount of current is applied to the first resistor $R_{110}$, and a low voltage is subsequently generated in the first resistor $R_{110}$. On the other hand, if the load 140 is heavy, a great amount of current is applied to the load 140. As a consequence, a great amount of current is applied to the load 140, and a high voltage is subsequently applied to the first resistor $R_{110}$.

Figure 4B:
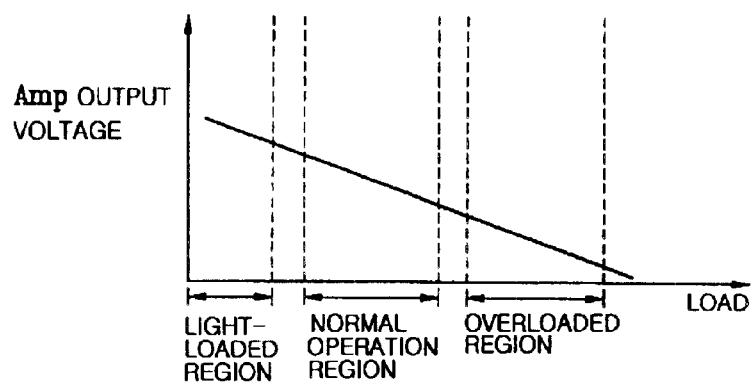

The voltage applied to the first resistor $R_{110}$ of the output current detecting section 150 is applied to the inverting input terminal (−) of the amplifier 150a through the second resistor $R_{120}$, while the voltage divided by the third resistor $R_{130}$ and the fourth resistor $R_{140}$ is applied to the non-inverting input terminal (+) of the amplifier 150a. The output voltage laid on the output terminal of the amplifier 150a is as shown in FIG. 4B. This means that the voltage applied to the non-inverting input terminal (+) of the amplifier 150a is a constant voltage. With respect to the voltage applied to the non-inverting input terminal (−), a voltage applied to the first resistor $R_{110}$ passes the second resistor $R_{120}$. Therefore, the voltage within the light load region applied to the non-inverting input terminal of the amplifier 150a is lower than the reference voltage by a predetermined level applied to the corresponding non-inverting input terminal, and a voltage higher than a predetermined level is outputted to the output terminal of the amplifier 150a as shown in FIG. 4B. By contrast, a voltage applied to the non-inverting input terminal of the amplifier 150a within a heavy load region is higher than the reference voltage by a predetermined level applied to the corresponding non-inverting input terminal. Therefore, a voltage lower than the reference voltage by a predetermined level is outputted from the output terminal of the amplifier 150a as shown in FIG. 4B.

The third diode $D_{130}$ of the output current detecting section 150 receives a DC voltage of a predetermined level, which passes the first diode $D_{110}$ of the output rectifying section 130, through the sixth resistor $R_{160}$. As a consequence, the current difference between the third diode $D_{130}$ and the output voltage of the amplifier 150a flows in the third diode $D_{130}$, and a subsequent optical signal is generated. The optical signal is inputted to the base of the first transistor $Q_{110}$ of the output current feedback section 160.

Figure 4C:
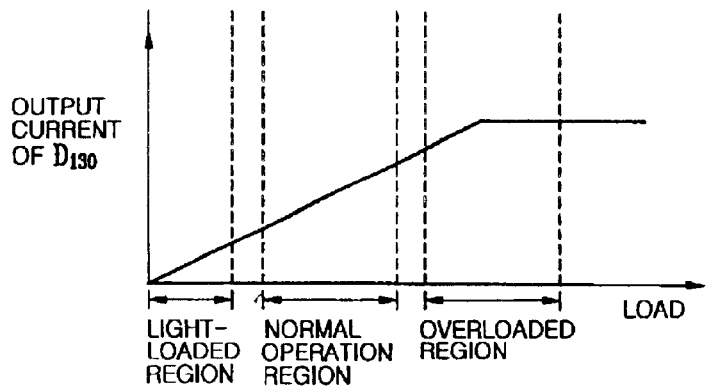

Here, the DC voltage of a predetermined level rectified by the first diode $D_{110}$ of the output rectifying section 130 is applied to the anode of the third diode $D_{130}$ on a steady basis, and the amount of current flowing in the third diode $D_{130}$ is variable according to the output voltage of the amplifier 150a. To be specific, if the output voltage of the amplifier 150a is higher than a predetermined level, the voltage difference between the DC voltage applied to the third diode $D_{130}$ and the output voltage of the amplifier 150a becomes small. Thus, as shown in FIG. 4C, a small amount of current flows in the third diode $D_{130}$. If the output voltage of the amplifier 150a is lower in a heavy load region by a predetermined level, the voltage difference between the DC voltage applied to the third diode D130 and the output voltage of the amplifier 150a becomes great. Therefore, as shown in FIG. 4C, a great amount of current flows in the third diode $D_{130}$.

Figure 3B:
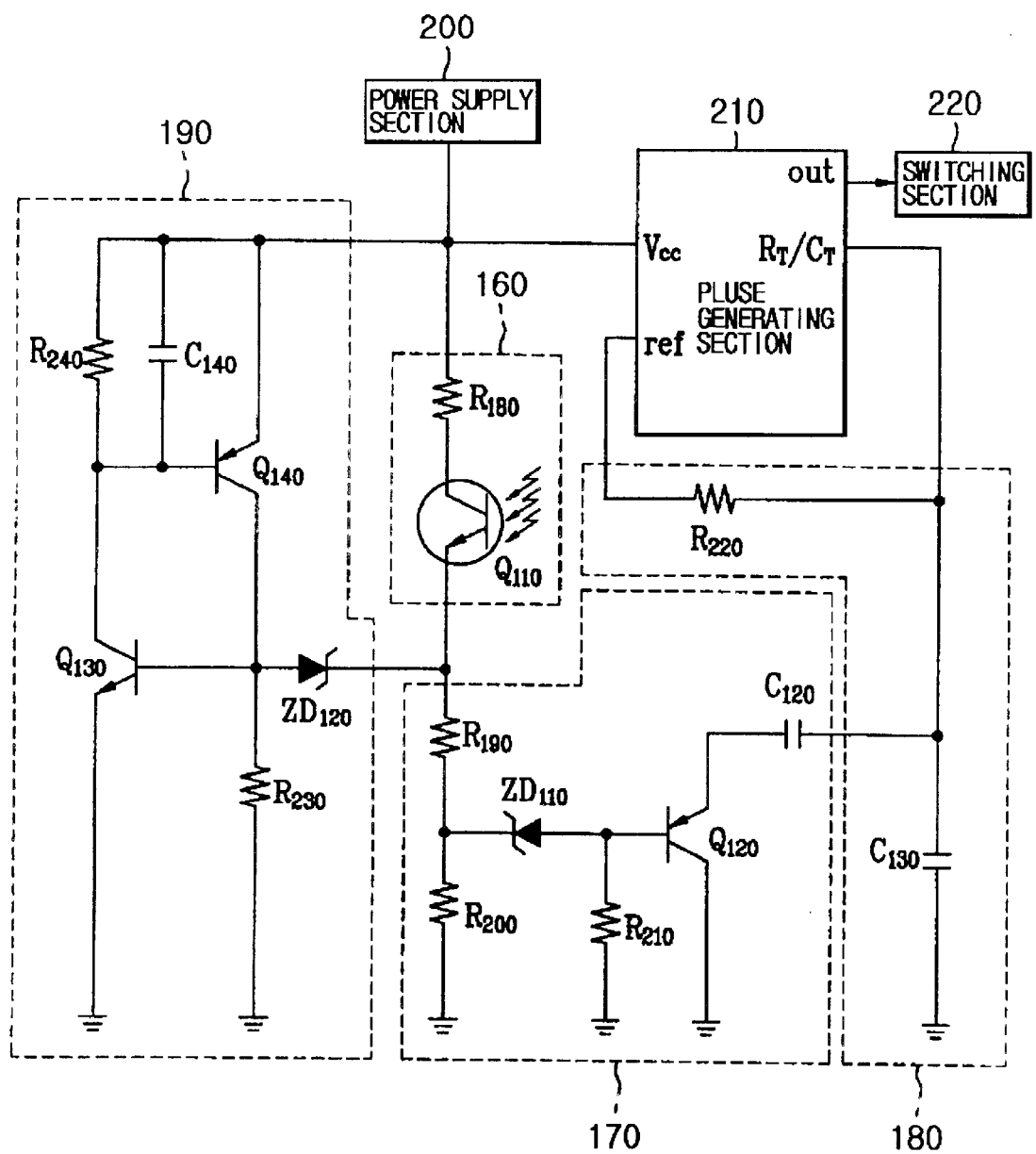

The first transistor $Q_{110}$ of the output current feedback section 160 receives the optical signal transmitted from the third diode $D_{130}$ of the output current detecting section 150 at the base, and outputs the corresponding current. To be specific, as shown in FIG. 3B, the first transistor $Q_{110}$ of the output current feedback section 160 receives the voltage outputted from the Vcc terminal of the pulse generating section 210 at the collector through the eighth resistor $R_{180}$, and outputs a collector current 130 to the emitter as the predetermined signal transmitted by the third diode $D_{130}$ of the output current detecting section is inputted to the base of the first transistor $Q_{110}$.

Subsequently, the voltage of the emitter A of the first transistor $Q_{110}$ is calculated as defined in the following Equation 1.

Emitter Voltage A of $Q_{110}$=$I_{130}(R_{190}+R_{200})$ [V]   Equation 1

Here, the emitter voltage A of the first transistor $Q_{110}$ is proportional to the current $I_{130}$ flowing in the corresponding collector, as defined by the Equation 1.

Figure 4D:
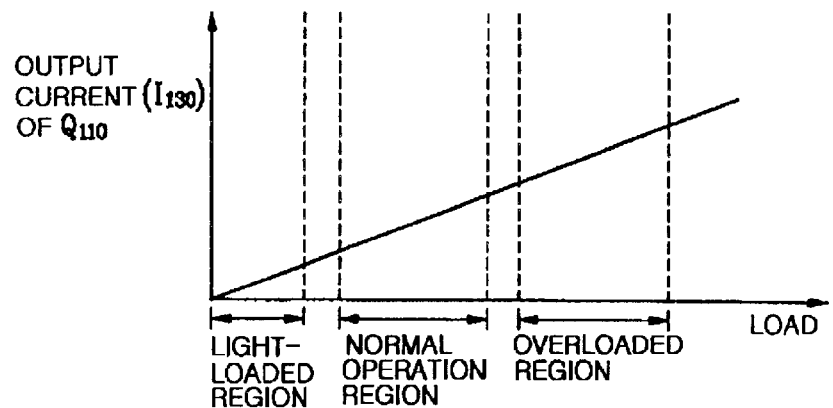

When the current within the light load region flows in the base of the first transistor $Q_{110}$ as shown in FIG. 4C, a small amount of current 130 from the collector is outputted to the emitter of the first transistor $Q_{110}$ as shown in FIG. 4D.

If the current within the heavy load region is applied to the base of the first transistor $Q_{110}$ as shown in FIG. 4C, a great amount of current $I_{130}$ of the collector is outputted to the emitter of the first transistor $Q_{110}$ as shown in FIG. 4D.

The frequency down section 170 receives the emitter voltage A of the first transistor $Q_{110}$ of the output current feedback section 160 that has been divided by the ninth resistor $R_{190}$ and the tenth resistor $R_{200}$, which are connected in parallel. If the voltage divided by the ninth resistor $R_{190}$ and the tenth resistor $R_{200}$ is lower than the breakdown voltage of the first Zener diode $ZD_{110}$, i.e., if the emitter voltage A of the first transistor $Q_{110}$ becomes lower than the breakdown voltage of the first Zener diode $ZD_{110}$ due to an output of the current $I_{130}$ within the light load region, the first Zener diode $ZD_{110}$ is turned off, and no signal is applied to the base of the second transistor $Q_{120}$. As a consequence, the corresponding second transistor $Q_{120}$ is turned on. The time constant representing the frequent setting section 180 is subsequently varied, and the pulse generating section 210 generates pulses having a frequency according to the varied time constant. The frequency at that time can be expressed by the following Equation 2.

$F_1$=1.8÷[$R_{220}$×($C_{120}$+$C_{130}$)]   Equation 2

Here, the frequency generation section 210 generates a frequency according to the time constant inputted to the $R_T/C_T$ terminal. In other words, the pulse generating section 210 generates pulses having the frequency $F_1$ in the Equation 2, and transmits the pulses to the switching section 220.

Figure 4E:
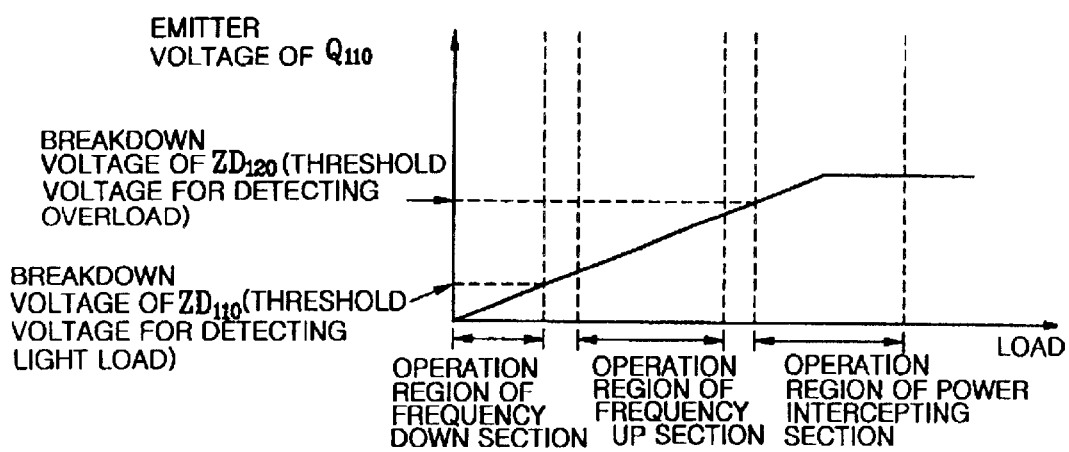

On the other hand, the emitter voltage A of the first transistor $Q_{110}$ within the normal operation region is higher than the breakdown voltage of the first Zener diode $ZD_{110}$ of the frequency down section 170 and within the region lower than the breakdown voltage of the second Zener diode $ZD_{120}$, as shown in FIG. 4E.

Since the emitter voltage A of the first transistor $Q_{110}$ is higher than the breakdown voltage of the first Zener diode $ZD_{110}$, the first Zener diode $ZD_{110}$ is turned on so as to apply a predetermined signal to the base of the second transistor $Q_{120}$.

At this stage, the second transistor $Q_{120}$ is turned off, and the capacitor $C_{120}$ is not connected to the capacitor $C_{130}$ of the frequency oscillating section 180 in parallel. Subsequently, the time constant representing the frequency oscillating section is varied, and the pulse generating section 210 generates pulses having a frequency according to the varied time constant. The frequency at this stage can be expressed by the following Equation 3.

$F_2$=1.38÷[$R_{220}$×$C_{130}$]   Equation 3

The pulse generating section 210 supplies the pulses having the frequency $F_2$ in the Equation 3 to the switching section 220.

Here, the frequency $F_1$, applied to the pulse generating section 210 from the light load region is lower than the frequency $F_2$ by a predetermined level. Therefore, consumption of electric power generated in accordance with operation of the switching section 220 can be reduced by reducing operation of the switching section 220 through reduction of the frequency generated from the pulse generating section 210.

If the third diode $D_{130}$ of the output current detecting section 150 outputs the current in the heavy load region as shown in FIG. 4C, the first transistor $Q_{110}$ of the output current feedback section 160 is turned on by receiving the signal transmitted by the third diode $D_{130}$ at the base, and outputs a great amount of current $I_{130}$ to the emitter of the corresponding first transistor $Q_{110}$ as shown in FIG. 4D. Since the emitter voltage A of the first transistor $Q_{110}$ is proportional to the current $I_{130}$ as defined by the Equation 1, the emitter voltage A of the first transistor $Q_{110}$ is increased as shown in FIG. 4E if the current $I_{130}$ is increased.

If the emitter voltage A of the first transistor $Q_{110}$ is higher than the breakdown voltage of the second Zener diode $ZD_{120}$ of the power intercepting section 190, the second Zener diode $ZD_{120}$ is turned on to output a predetermined signal to the base of the third transistor $Q_{130}$. The third transistor $Q_{130}$ is subsequently turned on, and a signal of 0V is applied to the fourth transistor $Q_{140}$ having a base connected to the collector of the third transistor $Q_{130}$.

The fourth transistor $Q_{140}$ is turned on, and the voltage applied to the Vcc terminal of the pulse generating section 210 from the power supply section 200 is by-passed to a collector terminal of the fourth transistor $Q_{140}$. To be specific, if the current transmitted by the output current detecting section 150 is sensed to be heavy by the output current feedback section 160, i.e., overloaded, the voltage applied to the pulse generating section 210 is by-passed to cease the corresponding pulse generating section 210. The system connected to the first winding and the second winding of the SMPS transformer 120, i.e., the entire system, ceases to operate by ceasing operation of the switching section 220.

In short, damage of the SMPS circuit causable by an overload can be prevented by ceasing operation of the entire system after sensing of the heavy current generated from the secondary winding of the SMPS transformer 120 by the output current feedback section 160 of the primary winding.

As described above, the SMPS protection circuit in an electronic appliance according to the present invention has an effect of enhancing reliability of the product by including a single output current feedback section, i.e., a single photo coupler, in the primary winding of the SMPS to sense variation of the load at the secondary winding of the SMPS and to prevent damage of the SMPS circuit causable by an overload.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An SMPS protection circuit in an electronic appliance, comprising:

a power supply section for receiving and converting an AC voltage to a driving voltage to output the driving voltage;

a pulse generating section for receiving the driving voltage outputted by the power supply section and generating pulses of a predetermined frequency;

a frequency oscillating section for providing a time constant for setting the frequency of the pulses from the pulse generating section;

an SMPS transformer having a primary winding for applying an input DC power thereto, and a secondary winding for inducing an AC power therein;

a switching section for switching the DC voltage inputted to the primary winding in accordance with the pulses generated from the pulse generating section;

an output rectifying section for rectifying the output DC power of the SMPS transformer, and supplying the rectified power to a load;

an output current detecting section for outputting a predetermined signal corresponding to a difference between the DC power source outputted from the output rectifying section and the voltage descended due to the load;

an output current feedback section for outputting a voltage corresponding to the predetermined signal outputted from the output current detecting section;

a frequency down section for reducing the output power of the SMPS transformer by downing the frequency of the output pulses from the pulse generating section through variation of the time constant of the frequency oscillating section, if the voltage outputted from the output current feedback section is within a first set voltage range representing that the voltage outputted from the output current feedback section is in a light load region; and a power intercepting section connected between an output terminal of the driving voltage of the power supply section and the pulse generating section for ceasing operation of the SMPS transformer by ceasing operation of the pulse generating section through by-passing the driving voltage of the pulse generating section.

2. The SMPS protection circuit of claim 1, wherein the output current detecting section comprises:

an amplifier for subtracting the voltage lowered by the load from a predetermined voltage, and amplifying the subtracted voltage; and a diode for receiving the output voltage of the amplifier through its cathode, receiving the output voltage of the output rectifying section through its anode to pass therein a current corresponding to a voltage difference therebetween, and outputting an optical signal of an optical quantity corresponding to the amount of current.

3. The SMPS protection circuit of claim 2, wherein the output current detecting section further comprises:

a first resistor connected between the load and ground; and a second resistor having one end terminal connected to the load in parallel to the first resistor and the other end terminal connected to an inverting input terminal of the amplifier so as to supply a voltage lowered by the load to the inverting input terminal of the amplifier.

4. The SMPS protection circuit of claim 2, wherein the output current feedback section comprises a phototransistor for receiving an optical signal outputted from the diode and generating a current having an amount equivalent to the optical quantity.

5. The SMPS protection circuit of claim 4, wherein the frequency down section comprises:
 a plurality of resistors for dividing an emitter voltage of the phototransistor;
 a diode for receiving the divided voltage so as to be turned on when the divided voltage is higher than its breakdown voltage, and turned off when the divided voltage is lower than the breakdown voltage;
 a capacitor having one end terminal connected to the frequency oscillating section in parallel and the other end terminal grounded on earth so as to reduce the time constant represented by the frequency oscillating section when the other end terminal is grounded; and
 a transistor for grounding the other end of the capacitor to the earth by being turned off when the diode is turned on to open the other end terminal of the capacitor and by being turned on when the diode is turned off.

6. The SMPS protection circuit of claim 4, wherein the power intercepting section comprises:
 a diode for receiving the emitter voltage of the phototransistor that is turned on when the emitter voltage is higher than the breakdown voltage;
 a first transistor having a base connected to an anode of the diode that is turned on when the diode is turned on;
 a second transistor having a base connected to a collector of the first transistor to discharge a driving power outputted from the power supply section by being turned on when the first transistor is turned on; and
 a resistor and a capacitor connected between a base terminal of the second transistor and an emitter terminal in parallel.

\* \* \* \* \*